Oct. 1, 1929.  W. R. MITTENDORF  1,729,789
SCALE
Filed May 5, 1927   2 Sheets-Sheet 2
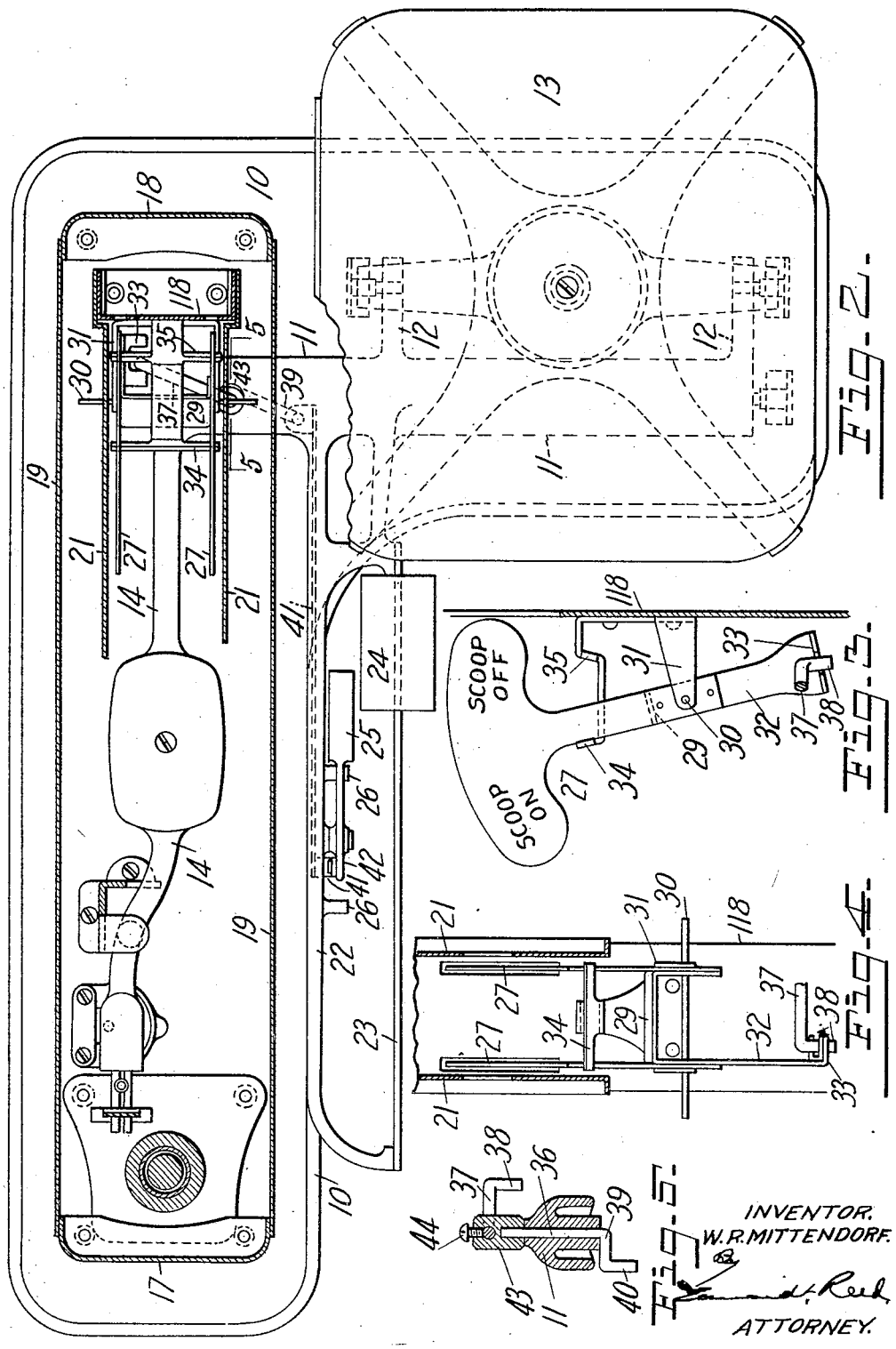
INVENTOR.
W. R. MITTENDORF.
ATTORNEY.

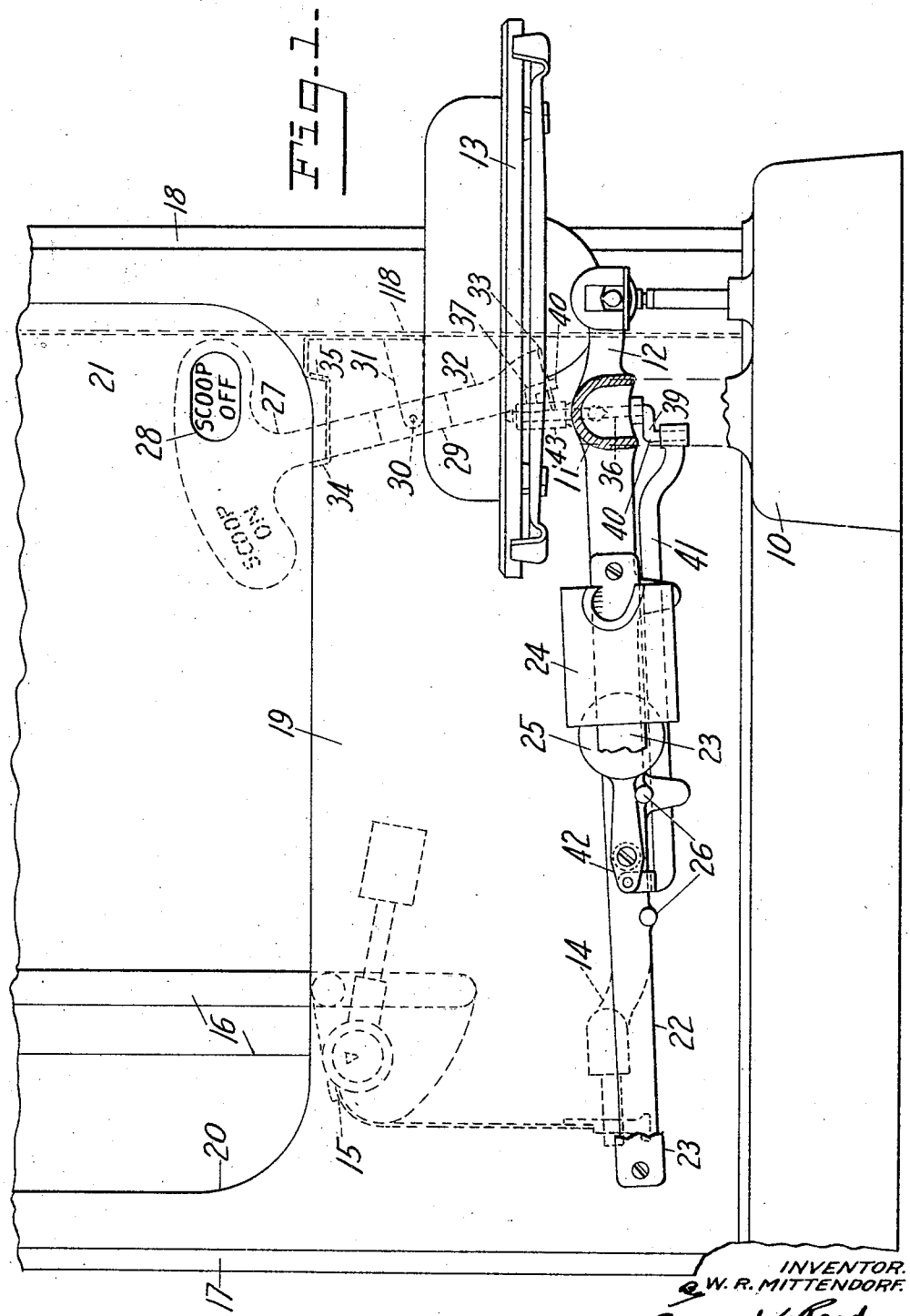

Patented Oct. 1, 1929

1,729,789

UNITED STATES PATENT OFFICE

WILLIAM R. MITTENDORF, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

SCALE

Application filed May 5, 1927. Serial No. 188,953.

This invention relates to scales and more particularly to computing scale of that type in which the commodity to be weighed or the value of which is to be computed may be placed either directly upon the load platform or in a scoop removably supported on said platform. It is customary to provide such a scale with means for counter-balancing the weight of the scoop when the latter is used and it is desirable that the position of this counter-balancing means should be indicated to the customer. The counter-balancing means is usually in the form of a weight movable from one position to another and when this weight is so arranged that it is visible to the customer it is only necessary to provide suitable indications, such as the words "Scoop on" and "Scoop off", adjacent to the respective positions of the weight in order that the customer may be advised as to the position thereof. In many types of scales the counter-balancing means is not visible to the customer and it is then necessary to provide some other means for indicating to the customer the position of the counter-balancing means.

One object of the present invention is to provide a simple efficient mechanism for indicating to the customer the position of such a counter-balancing means.

A further object of the invention is to provide such an indicating means which will in no way interfere with the free movement of the weighing mechanism during the weighing operation.

Other objects of the invention will appear as the apparatus is described in detail.

In the accompanying drawings Fig. 1 is a front elevation, partly broken away, of a scale embodying my invention; Fig. 2 is a horizontal sectional view of such a scale with the load platform in plan; Fig. 3 is a side elevation of the indicating device; Fig. 4 is a front elevaton of the indicating devce; and Fig. 5 is a transverse section taken through the hub of the main lever of the weighing mechanism on the line 5—5 of Fig. 2.

In these drawings I have illustrated one embodiment of my invention and have shown the same in connection with a scale of the type illustrated in the application for patent filed by me December 2, 1925, Serial No. 72,646, but it will be understood that this particular embodiment has been chosen for the purposes of illustration only and that the invention may take various forms and may be applied to scales of various kinds.

The scale here illustrated comprises a base 10 which carries the weighing and computing mechanisms. The weighing mechanism comprises a main lever consisting of an elongated transverse hub portion 11 pivotally supported at its ends on the base. Extending rearwardly from this hub portion, that is to the right in the drawings, are two arms 12 on which are supported the load platform 13. This load platform is of such a character that the commodity may be placed either directly thereon or a removable scoop, not here shown, may be placed thereon and the commodity placed in the scoop. Rigidly secured to the hub portion 11 of the lever, near one end thereof, is a main arm 14 which is connected at its free or forward end, as shown at 15, with a part of a computing mechanism, such as one of the indicating members, 16. The computing and indicating mechanism is arranged in a housing comprising upright standards 17 and 18 and front and rear walls 19. The front and rear walls are provided with sight openings 20 through which the computation indicating devices are visible, and arranged within and spaced from the respective walls 19 are cover plates 21, the computation indicating devices being arranged between these cover plates and the respective walls of the housing and various parts of the mechanism being arranged between the cover plates and thus concealed from view. The cover plates are supported by suitable standards, one of which is shown at 118. Rigidly secured to the hub 11 of the main lever and forming a part of that lever, in front of the housing, is a supplemental arm 22 which carries a tare beam 23 and a tare poise 24. Pivotally mounted on the supplemental arm of the main lever is a scoop counter-balancing weight 25 which is movable into a position in which it will counterbalance the weight of the platform alone, as shown in the drawings, or into a position in which it will counter-balance both the load platform and the empty scoop when the latter is in position on the platform. Stops 26 are provided to limit the movement of the counter-balancing weight and support the same in its adjusted positions. The mechanism so far described is a part of and is disclosed in the above mentioned application and need not be here described in further detail.

In order to indicate to the customer the position of the counter-balancing weight I have provided an indicating device which is connected with and positively controlled by the counter-balancing weight. Preferably this indicating device is arranged within the housing and, as here shown, it is in the form of a double indicator to indicate the position of the counterbalancing weight both to the customer and to the operator, and it comprises two indicating plates 27 pivotally supported on a stationary part of the scale structure and arranged between the cover plates 21 and adjacent to the respective cover plates, as shown in Fig. 4. The indicator plates are elongated in form and each carries, near the respective ends thereof, suitable indications, such as "Scoop on" and "Scoop off", these indications being so arranged that one or the other thereof will be in line with a sight opening 28 in the corresponding cover plate when the indicating device is in either of its normal positions. The two indicating plates are rigidly secured to a movable supporting member, here shown in the form of a yoke 29 mounted on a rod or shaft 30 supported by a bracket 31 secured to the standard 118 of the scale structure. This supporting member or yoke has a depending arm 32 which constitutes an actuating device therefor and which, in the present instance, has at its lower end a laterally extending bifurcated portion 33. It will be noted that the indicating device is overbalanced, that is, the portion above the axis thereof is of greater weight than the portion below the axis and consequently the indicating device will be held by gravity in the position to which it is moved. Any suitable means may be provided for so limiting the movement of the indicating device in either direction that the indications thereon will be properly located when that device is at either limit of its movement. In the present construction stop arms 34 and 35, supported by the standard 118, are arranged to engage the indicating device and limit its movement in the respective directions, these stop arms being here shown as an integral part of the bracket 31.

A suitable connecting device is interposed between the indicating device and the counterbalancing weight and in that form of the mechanism here shown, this connecting mechanism comprises an upright shaft 36 rotatably mounted in the hub portion 11 of the main lever and extending above and below the same. Secured to the upper end of the shaft 36 is an arm 37 having at its outer end a transverse portion 38 arranged between the two parts of the bifurcated portion 33 of the indicator arm 32. At its lower end the shaft 36 is provided with a second arm 39 having a transverse portion 40 which is pivotally connected with the adjacent end of a link 41 which extends lengthwise of the supplemental arm 22. The counter-balancing weight 25 has rigidly secured thereto and, in the present instance, formed integral therewith, a crank arm 42 which is pivotally connected with the adjacent end of the link 41, so that the movement of the counter-balancing weight about its axis will impart lengthwise movement to the link and this movement will be transmitted, through the shaft 36 and its connected parts, to the indicating device, thus causing the indicating device to be positively actuated by the counter-balancing weight and to accurately indicate the position of that weight. It is necessary that the connecting device should be so arranged with relation to the indicating device as to prevent any interference by the indicating device or by the connecting means with the free movement of the lever of the weighing mechanism. To this end the connection between the arm 37 and the actuating arm 32 of the indicating device is of a loose or open character which will permit the arm 37 to have sufficient movement with relation to the indicating device to prevent the same from contacting therewith when the arm 37 moves with the lever during the weighing operation. In the present instance the space between the two parts of the bifurcated portion 33 of the arm 32 of the indicating device is considerably greater than the diameter of the transverse portion 38 of the arm 37, and the arm 37 is so positioned with relation to the indicating device that when the indicating device and the counter-balancing weight are in either of their normal positions the part 38 of the arm 37 will be out of contact with both parts of the bifurcated portion of the arm 32 of the indicating device, thus permitting this arm to move with the lever of the weighing mechanism during the weighing operation, without contacting with the actuating arm of the indicating devices, and consequently the actuating device will in no way interfere with the free movement of the weighing mechanism. It is preferable that the arm 37 should be adjustable with relation to the lever of the weighing mechanism and I have therefore shown a supporting member 43 rigidly secured to the upper end of the shaft 36 and the arm 37 is adjustably mounted in this supporting member and is retained in adjusted positions therein by a set screw 44.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a scale comprising weighing mechanism having a platform adapted to support a removable scoop, a counter-balancing device mounted on a part of said weighing mechanism and movable to a position to counter-balance the dead weight of said scoop, an indicating device movably mounted on a normally stationary part of said scale, and an operative connection between said counter-balancing device and said indicating device.

2. In a scale comprising weighing mechanism having a platform adapted to support a removable scoop, a counter-balancing device mounted on a part of said weighing mechanism and movable to a position to counter-balance the dead weight of said scoop, an indicating device movably mounted on a normally stationary part of said scale, and means for operatively connecting said counter-balancing device with said indicating device and for permitting the free movement of said weighing mechanism with relation to said indicating device.

3. In a scale comprising a lever and a platform operatively connected with said lever and adapted to support a removable scoop, a device mounted on said lever and movable to a position to counter-balance the dead weight of said scoop, an indicating device movably mounted on a normally stationary part of said scale, and means for connecting said counter-balancing device with said indicating device to cause the latter to indicate the position of the former.

4. In a scale comprising a lever and a platform supported thereby, means mounted on said lever for counter-balancing the dead weight of a scoop placed upon said platform, an indicating device mounted upon the dormant part of said scale, and an operative connection between said counter-balancing means and said indicating device to cause the position of said counter-balancing means to be indicated by said indicating device.

5. In a scale comprising a lever and a platform operatively connected with said lever and adapted to support a removable scoop, a weight pivotally mounted on said lever and movable to a position to counterbalance the dead weight of said scoop, an indicating device movably mounted on a stationary part of said scale, and means for causing the movement of said pivoted weight to be transmitted to said indicating device.

6. In a scale comprising a lever and a platform operatively connected with said lever and adapted to support a removable scoop, a weight pivotally mounted on said lever and movable to a position to counter-balance the dead weight of said scoop, an indicating device movably mounted on a stationary part of said scale, and means comprising a link for operatively connecting said pivoted weight with said indicating device.

7. In a scale comprising a lever and a platform operatively connected with said lever and adapted to support a removable scoop, a weight mounted on said lever and movable to a position to counter-balance the dead weight of said scoop, an indicating device movably mounted on a stationary part of said scale, and means carried by said lever for operatively connecting said weight with said indicating device.

8. In a scale comprising a lever and a platform operatively connected with said lever and adapted to support a removable scoop, a weight mounted on said lever and movable to a position to counter-balance the dead weight of said scoop, an indicating device movably mounted on a stationary part of said scale, and means carried by said lever for operatively connecting said weight with said indicating device, said connecting means being so arranged with relation to said indicating device that said lever will have free movement with relation to said indicating device.

9. In a scale comprising a lever and a platform operatively connected with said lever and adapted to support a removable scoop, a weight mounted on said lever and movable to a position to counter-balance the dead weight of said scoop, an indicating device movably mounted on a stationary part of said scale, and means carried by said lever for operatively connecting said weight with said indicating device, said connecting means and said indicating means having cooperating parts arranged normally out of contact one with the other and movable into contact by the movement of said weight.

10. In a scale comprising a lever and a platform operatively connected with said lever and adapted to support a removable scoop, a weight mounted on said lever and movable to a position to counter-balance the weight of said scoop, an indicating device movably mounted on a normally stationary part of said scale, a shaft mounted on said lever, and means for connecting said shaft with said weight and with said indicating device.

11. In a scale comprising a lever having a hub portion and a platform operatively connected with said lever and adapted to support a removable scoop, a weight pivotally mounted on said lever, a crank arm connected with said weight, an indicating device movably mounted in a normally stationary part of said scale, a shaft rotatably mounted on the hub portion of said lever, an arm secured to said shaft, a link to connect said arm with the crank arm of said weight, a second arm secured to said shaft, and means for operatively connecting said second arm with said indicating device.

12. In a scale comprising a lever having a hub portion and a platform operatively connected with said lever and adapted to support a removable scoop, a weight pivotally mounted on said lever, a crank arm connected with said weight, an indicating device pivotally mounted on a normally stationary part of said scale and having a part provided with an opening, a shaft rotatably mounted on the hub portion of said lever, an arm secured to said shaft, a link for connecting said arm with the crank arm of said weight, a second arm secured to said shaft and having a part extending through the opening in said part of said indicating device, whereby the movement of said shaft will be transmitted to said indicating device.

13. In a scale comprising a lever having a hub portion and a platform operatively connected with said lever and adapted to support a removable scoop, a weight pivotally mounted on said lever, a crank arm connected with said weight, an indicating device pivotally mounted on a normally stationary part of said scale and having a part provided with an opening, a shaft rotatably mounted on the hub portion of said lever, an arm secured to said shaft, a link for connecting said arm with the crank arm of said weight, a second arm secured to said shaft and having a part extending through the opening in said part of said indicating device, whereby the movement of said shaft will be transmitted to said indicating device, said opening being of a relatively large size and said arm being so positioned with relation to said indicating device that when said weight and said indicating device are in their normal positions said part of said arm will be out of contact with said indicating device.

14. In a scale comprising a lever, a platform operatively connected with said lever and adapted to support a removable scoop, and a housing having a sight opening, a weight mounted on said lever and movable to a position to counter-balance the weight of said scoop, an indicating device movably supported on a normally stationary part of said scale, arranged within said housing and having two indications either of which may be moved into line with said sight opening, and means carried by said lever for operatively connecting said weight with said actuating device.

15. In a scale comprising a lever, a platform operatively connected with said lever and adapted to support a removable scoop and a housing having a sight opening, a weight mounted on said lever and movable to a position to counter-balance the weight of said scoop, an indicating device pivotally mounted on a normally stationary part of said scale and having a part arranged within said housing and provided with two indications either of which may be moved into line with said sight opening, means for limiting the movement of said actuating device about its axis in either direction, and means carried by said lever for operatively connecting said weight with said indicating device.

16. In a scale comprising a lever, a platform operatively connected with said lever and adapted to support a removable scoop, and a housing having sight openings in the front and rear sides thereof, a weight mounted on said lever and movable to a position to counter-balance the weight of said scoop, an indicating device pivotally supported on a normally stationary part of said scale and comprising two indicating members arranged adjacent to the respective sides of said housing and each having two indications either of which may be moved into line with the adjacent sight opening, means for limiting the movement of said indicating device in either direction about its axis, means supported by said lever for operatively connecting said movable weight with said indicating device.

17. In a scale comprising a lever having a hub portion and a platform operatively connected with said lever and adapted to support a removable scoop, a weight pivotally mounted on said lever, a crank arm connected with said weight, an indicating device pivotally mounted on a normally stationary part of said scale and having a part provided with an opening, a shaft rotatably mounted on the hub portion of said lever, an arm secured to said shaft, a link for connecting said arm with the crank arm of said weight, a second arm secured to said shaft and having a part extending through the opening in said part of said indicating device, whereby the movement of said shaft will be transmitted to said indicating device, said opening being of a relatively large size and said arm being so positioned with relation to said indicating device that when said weight and said indicating device are in their normal positions said part of said arm will be out of contact with said indicating device, and means for adjustably connecting said second arm with said shaft.

18. In a weighing scale having a load platform to support commodities to be weighed and adapted also to support a removable commodity receptacle, a pivoted counterbalance for the dead weight of said receptacle, said counterbalance being arranged for rotation into one of two normal positions, and a device mounted independently of said counterbalance and controlled thereby to indicate the position occupied by said counterbalance.

19. In a weighing scale having a load platform to support commodities to be weighed and adapted also to support a removable commodity receptacle, means comprising a pivoted counterbalance weight to counterbalance the dead weight of said receptacle, said counterbalance weight being arranged for pivotal movement into one of two normal positions, and a device mounted independently of said counterbalance and controlled thereby to indicate the position of said counterbalance weight.

In testimony whereof, I affix my signature hereto.

WILLIAM R. MITTENDORF.